United States Patent
Doi

(10) Patent No.: US 7,107,085 B2
(45) Date of Patent: Sep. 12, 2006

(54) MOBILE COMMUNICATION TERMINAL, COMMUNICATION METHOD AND PROGRAM

(75) Inventor: Yoshiharu Doi, Gifu (JP)

(73) Assignee: Sanyo Electric Co., Ltd, Moriguchi (JP)

(*) Notice: Subject to any disclaimer, the term of this patent is extended or adjusted under 35 U.S.C. 154(b) by 380 days.

(21) Appl. No.: 09/905,131

(22) Filed: Jul. 13, 2001

(65) Prior Publication Data

US 2002/0028694 A1    Mar. 7, 2002

(30) Foreign Application Priority Data

Jul. 14, 2000 (JP) ............................. 2000-215099

(51) Int. Cl.
*H04M 1/00* (2006.01)
(52) U.S. Cl. .................. 455/575.7; 455/101; 455/129; 455/132; 455/133; 455/134; 455/135; 455/136; 455/137; 455/138; 455/522
(58) Field of Classification Search ............. 455/550.1, 455/25, 9, 11.1, 11.3, 5, 8, 17, 279.1, 575.7, 455/427, 428, 526, 272, 101, 129, 132–138, 455/522
See application file for complete search history.

(56) References Cited

U.S. PATENT DOCUMENTS 5,710,995 A * 1/1998 Akaiwa et al. .......... 455/277.2
6,285,893 B1 * 9/2001 Keirinbou ................. 455/575.7
6,297,780 B1 * 10/2001 Kirisawa ..................... 343/703
2001/0029173 A1 * 10/2001 Ogino ....................... 455/279.1
2001/0055948 A1 * 12/2001 Ikeda et al. ................ 455/13.3

FOREIGN PATENT DOCUMENTS

| JP | 62-000105 | 1/1987 |
| JP | 08-167871 | 6/1996 |
| JP | 8195704 | 7/1996 |
| JP | 9321677 | 12/1997 |
| JP | 10163938 | 6/1998 |
| JP | 11-122152 | 4/1999 |
| JP | 2000174678 | 6/2000 |

* cited by examiner

*Primary Examiner*—Nay Maung
*Assistant Examiner*—Angelica Perez

(57) ABSTRACT

A mobile communication terminal having adaptive array antennas is provided that is capable of transmitting signals to an intended base station without interfering other devices, even when a reception error occurs. The mobile communication terminal basically performs array transmission/reception using weight vectors produced in reception to weight and combine signals received via antennas, and thereby receives a desired signal. In transmission, the mobile communication terminal uses the weight vectors used in reception to weight and combine transmission signals and transmits them. However, when an error detection circuit detects a reception error in the desired signal, a transmission control unit turns off a switch for the antenna and transmits the transmission signals in a non-directional pattern via the antenna, so that the transmission signal reaches the intended base station.

28 Claims, 6 Drawing Sheets

MOBILE COMMUNICATION TERMINAL, COMMUNICATION METHOD AND PROGRAM

This application is based on an application No. 2000-215099 filed in Japan, the content of which is hereby incorporated by reference.

BACKGROUND OF THE INVENTION

1. Field of the Invention

The present invention relates to a communication technology for a mobile communication terminal that uses an adaptive array antenna.

2. Related Art

In recent years, increasing attention has been given to the adaptive array method in the field of mobile communication to make efficient use of frequencies and improve communication quality. The adaptive array method is a communication method that performs transmission/reception by adjusting a signal amplitude and phase for each of a plurality of antennas, thereby enhancing a radiant intensity or reception sensitivity with regard to a direction from which a desired signal comes.

A mobile communication system that uses the adaptive array method employs a communication technology in which a base station, equipped with an adaptive antenna array made up of multiple antennas and a control unit, tracks the movement of a mobile communication terminal.

Also, with the recent development of small and light antennas such as a tip antenna, it becomes possible to integrate an adaptive antenna array into a mobile communication terminal.

The following describes how a mobile communication terminal which includes adaptive array antennas controls directivity patterns.

For example, a PHS (personal Handyphone System), a mobile communication terminal, performs transmission and reception alternately in a TDD frame unit using a TDD (Time Division Duplex) method. When receiving a frame, the mobile communication terminal receives known signals such as preambles and unique words from a base station via a plurality of antennas. The mobile communication terminal adds weights to the received signals for each antenna using weight vectors and combines the weighted signals. The weight vectors are adjusted so as to minimize the difference between the resulting combination of signals and a reference signal that is stored in advance (a signal indicating a preamble or a unique word) for the purpose of optimizing the weight vectors. Using the optimum weight vectors, each signal received via the plurality of antennas is weighted and the weighted signals are combined, so that the mobile communication terminal can receive desired signals from the base station. When transmitting a signal to the base station, the mobile communication terminal distributes transmission signals to the plurality of antennas and applies weights to the distributed signals using the weight vectors calculated at the time of reception. Here, to perform reception or transmission with a reception sensitivity or radiant intensity being increased in a predetermined direction is referred to as forming a directivity pattern and performing transmission or reception.

However, due to problems such as weak electrical fields, interference and losses of synchronization, there are cases where the mobile communication terminal cannot receive signals properly from the base station. In this case, transmission signals in the same frame will not be able to reach the base station with which the mobile communication terminal is communicating.

Which is to say, when the mobile communication terminal fails to properly receive signals from the base station, it calculates a weight vector from the improperly received signals and generates a directivity pattern. Because such a pattern does not have directivity towards the intended base station, transmission signals will not reach the base station. This also makes it impossible for the base station to generate a directivity pattern that has directivity towards the mobile communication terminal. Since neither the mobile communication terminal nor the base station can form directivity patterns towards the other device, their transmission signals will not reach the destination. Unless the channel in use is switched, normal communication between them will not be restored.

In addition, the use of a wrong weight vector causes the formation of a directivity pattern having increased radiant intensity towards another unrelated base station or mobile communication terminal, thereby interfering with such unrelated base stations and mobile communication terminals.

SUMMARY OF THE INVENTION

To solve these problems, the present invention intends to provide a mobile communication terminal, communication method, and program that enables transmission signals to reach an intended base station without causing interference with other devices, even when signals sent from the base station are not received properly.

To achieve the above object, the present invention provides a mobile communication terminal for performing reception and transmission using an adaptive array method, the mobile communication terminal being provided with (a) a plurality of antennas, (b) a reception unit for forming a directivity pattern for receiving a desired reception signal and receiving the reception signal using the formed directivity pattern, and (c) a transmission unit for transmitting a transmission signal using the directivity pattern formed in reception, the mobile communication terminal includes: a detection unit for detecting a reception error in the reception signal; and a transmission control unit for controlling the transmission unit when the detection unit detects the reception error so that a pattern different from the directivity pattern formed in reception is formed and the transmission signal is transmitted in the formed pattern.

With the stated construction, when an inappropriate directivity pattern is formed during reception, in other words, when a formed directivity pattern does not have a high directivity in a direction in which desired signals travel, the mobile communication terminal detects an error and thereby detects that an improper directivity pattern is formed during reception, and forms another directivity pattern during transmission. This prevents signals from being sent in an inappropriate directivity pattern, and as a result the signals can reach an intended base station.

The transmission control unit can be constructed so as to form a non-directional pattern to transmit signals using one of the antennas when the detection unit detects an error.

When using the mobile communication terminal with this construction, there is a higher probability of transmission signals reaching an intended base station increases than when using a mobile communication terminal that continues to form the same directivity patterns as the original pattern that is formed in a direction from which signals travel.

The transmission control unit can be constructed so as to control transmission so that when the detection unit detects an error, a non-directional pattern is formed using an antenna with the largest antenna gains among the plurality of antennas.

Since signals transmitted from the antenna with the largest antenna gains can travel a longer distance than signals transmitted from an antenna with smaller antenna gains, the mobile communication terminal with the stated construction has a higher probability of sending signals to an intended base station.

The mobile communication terminal further includes: a selection unit for measuring a quality of the reception signal for each of the plurality of antennas and selecting an antenna with the highest reception quality, wherein when the detection unit detects the reception error, the transmission control unit controls the transmission unit so that the non-directional pattern is formed using the antenna selected by the selection unit, and the transmission signal is transmitted in the non-directional pattern.

With the stated construction, there is a higher probability of transmission signals reaching an intended base station using an antenna of a higher reception quality than using an antenna of a lower reception quality.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENTS

The following describes a mobile communication terminal according to the embodiments of the invention, with reference to the attached drawings.

First Embodiment

Figure 1:
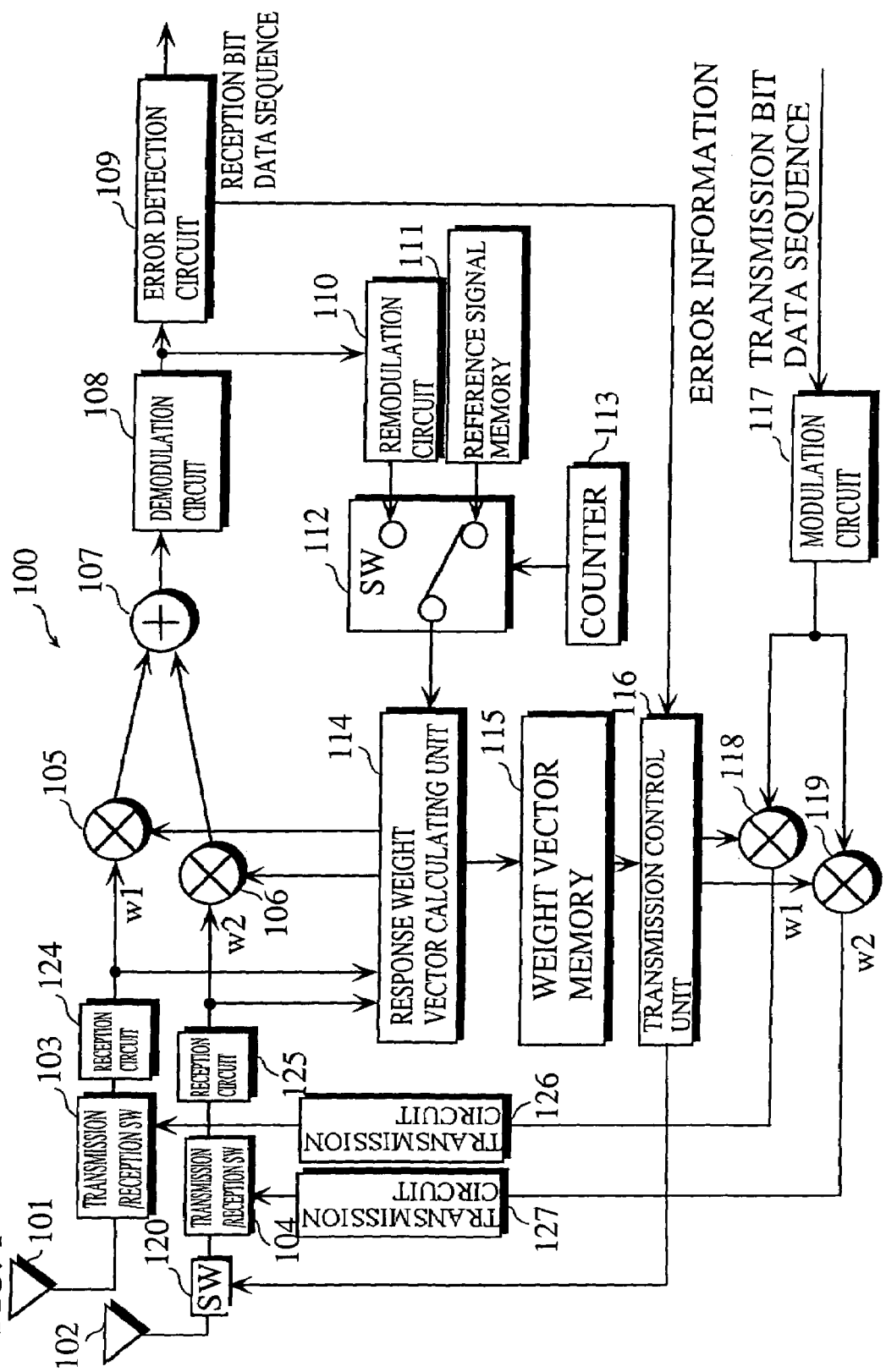
FIG. 1 is a block diagram showing a main construction of a mobile communication terminal in the first embodiment of the present invention.

FIG. 1 is a block diagram showing a main construction of a mobile communication terminal in the first embodiment of the invention.

As shown in FIG. 1, a mobile communication terminal 100 includes antennas 101 and 102, reception circuits 124 and 125, transmission/reception switches 103 and 104, multipliers 105 and 106, an adder 107, a demodulation circuit 108, an error detection circuit 109, a remodulation circuit 110, a reference signal memory 111, a switch 112, a counter 113, a response weight vector calculating unit 114, a weight vector memory 115, a transmission control unit 116, a modulation circuit 117, multipliers 118 and 119 and a switch 120.

The antenna 101 is a rod antenna and the antenna 102 is a tip antenna which is provided on a substrate inside the mobile communication terminal 100.

The transmission/reception switches 103 and 104 switch between reception and transmission.

The reception circuits 124 and 125 convert high frequency signals received via the antennas 101 and 102 to low frequency signals. Note that the mobile communication terminal 100 alternately performs transmission and reception for each TDD frame of the TDD method according to time-division multiplexing.

The multipliers 105 and 106 weight signals from the reception circuits 124 and 125 by multiplying the signals by weight vectors W1 and W2 which are output from the response weight vector calculating unit 114. The multipliers then output weighted signals to the adder 107.

The adder 107 adds the weighted signals and outputs the resulting signal to the demodulation circuit 108.

The demodulation circuit 108 demodulates the signal from the adder 107, and outputs the resulting reception bit data sequence.

The remodulation circuit 110 remodulates the reception bit data sequence into symbol waveform data.

The reference signal memory 111 retains a reference signal table which stores symbol waveform data showing reference signals. A reference signal is a known fixed bit pattern contained at a predetermined location in a signal that is transmitted from the base station to the mobile communication terminal 100. Under the PHS standard, for instance, the reference signals are ramp bits, a start symbol, a preamble or a unique word in a slot.

A counter 113 counts the number of symbols in a reception slot from beginning to end, in accordance with the symbol timing. The count value is used to distinguish a period of a fixed bit pattern from the other periods.

When the count value indicates a period of a fixed bit pattern, the switch 112 selects symbol waveform data showing reference signals read from the reference signal memory 111. In other periods, the switch 112 selects symbol waveform data from the remodulation circuit 110. The switch 112 outputs the selected symbol waveform data to the response weight vector calculating unit 114.

The response weight vector calculating unit 114 calculates the weight vectors W1 and W2 for each symbol, so as to minimize the difference between the signal obtained by the adder 107 and the symbol waveform data received through the switch 112.

The weight vector memory 115 contains a RAM and a ROM, and stores the weight vectors W1 and W2 calculated by the response weight vector calculating unit 114.

The error detection circuit 109 detects a reception error in the reception bit data sequence obtained by the demodulation circuit 108. In more detail, the error detection circuit 109 compares a unique word of the reception bit data sequence with a unique word stored in advance. When at least one of the cases is detected where there is a mismatch of no less than a predetermined number (for instance, 2 bits) of bits and where there is a CRC (Cyclic Redundancy Check) error, the error detection circuit 119 informs the transmission control unit 116 that a reception error is detected.

The modulation circuit 117 modulates a bit data sequence to be transmitted in a transmission slot to generate transmission signals (symbol data).

The transmission control unit 116 reads the weight vectors W1 and W2 from the weight vector memory 115 and outputs them to the multipliers 118 and 119 for the purpose of weighting the transmission signals outputted from the modulation circuit 117.

Here, if the reception error is notified from the error detection circuit 109, the transmission control unit 116 does not provide the weight vectors W1 and W2 to the multipliers 118 and 119 but turns off the switch 120 in the transmission of the current frame. By doing so, the transmission control unit 116 controls the transmission signals from the modulation circuit 117 to be outputted via the antenna 101 without being weighted. As a result of this control, transmission signals in a frame in which a reception error is detected can be transmitted in an omnidirectional pattern, that is, a non-directional pattern. Here, the non-directional pattern refers to a pattern that has substantially the same radiant intensity in every direction from the antenna 101. The non-directional pattern extends in a horizontal direction substantially in the form of a circle. When a reception error is detected in one frame but is not detected in the following frame, the transmission control unit 116 provides the weight vectors W1 and W2 to the multipliers 118 and 119 to weight transmission signals. Through the switch 120, the transmission control unit 116 forms a directivity pattern that has enhanced radiant intensity towards the intended base station, and transmits the transmission signals via the antennas 101 and 102.

The multipliers 118 and 119 multiply the weight vectors W1 and W2 to weight the transmission signals outputted from the modulation circuit 117 and output the weighted signals to transmission circuits 126 and 127.

The transmission circuits 126 and 127 convert the weighted signals received from the multipliers 118 and 119 to high frequency signals, and output them to the antennas 101 and 102.

The following describes the operational procedure of the mobile communication terminal 100 with this construction.

Figure 2:
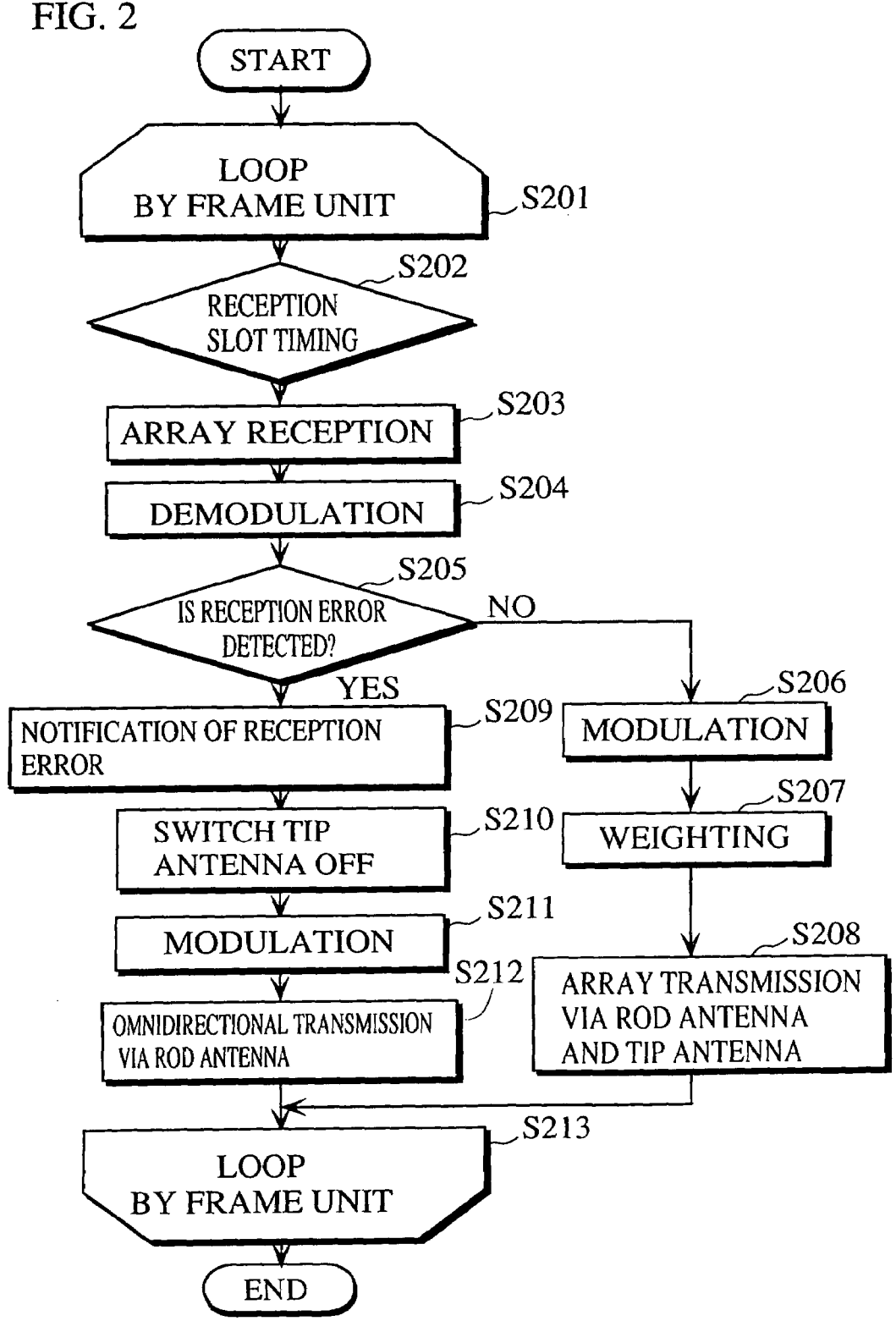
FIG. 2 is a flowchart showing an operational procedure performed by the mobile communication terminal, when the mobile communication terminal communicates with a base station.

FIG. 2 is a flowchart showing the operational procedure of the mobile communication terminal 100 which is performed during the communication with a base station.

As shown in FIG. 2, the mobile communication terminal 100 repeatedly performs steps S201 to S213 for each frame.

At a reception slot timing, the response weight vector calculating unit 114 calculates the weight vectors W1 and W2 for forming a directivity pattern that is highly sensitive to signals from the base station. Using the weight vectors W1 and W2, the multipliers 105 and 106 and the adder 107 weight and combine the reception signals, so that the mobile communication terminal 100 forms a directivity pattern having higher reception sensitivity in a direction towards the base station, and receives reception signals using the adaptive array (step S203). The demodulation circuit 108 demodulates the combined signal and outputs it to the error detection circuit 109. The error detection circuit 109 detects whether there is a unique word error or a CRC error in the demodulated reception bit data sequence.

If the error detection circuit 109 does not detect any errors (step S205), when a transmission slot of the current frame begins, the demodulation circuit 117 modulates a transmission bit data sequence and generates transmission signals (step S206). The transmission control unit 116 instructs the multipliers 118 and 119 to weight the transmission signals using the weight vectors W1 and W2 (step S207). As a result of the weighting, a directivity pattern having higher radiant intensity towards the base station is formed, and the transmission signals are transmitted from the antennas 101 and 102 (step S208).

On the other hand, when at least one of a unique word error and a CRC error is detected, the error detection circuit 109 informs the transmission control unit 116 of the detection of the reception error (step S209).

On being informed of the reception error detection, the transmission control unit 116 turns off the switch 120 (step S210) to prohibit the multipliers 118 and 119 from applying weights, so that the transmission signals modulated by the modulator circuit 117 are transmitted from the antenna 101 (steps S211 and S212). In this way, the antenna 101 forms a non-directional pattern to perform omnidirectional transmission.

Thus, the mobile communication terminal 100 receives signals by frame units using the adaptive array, and monitors if there are any reception errors. When a reception error is not detected, the mobile communication terminal 100 performs array transmission. When a reception error is detected, the mobile communication terminal 100 performs omnidirectional transmission.

Figure 3:
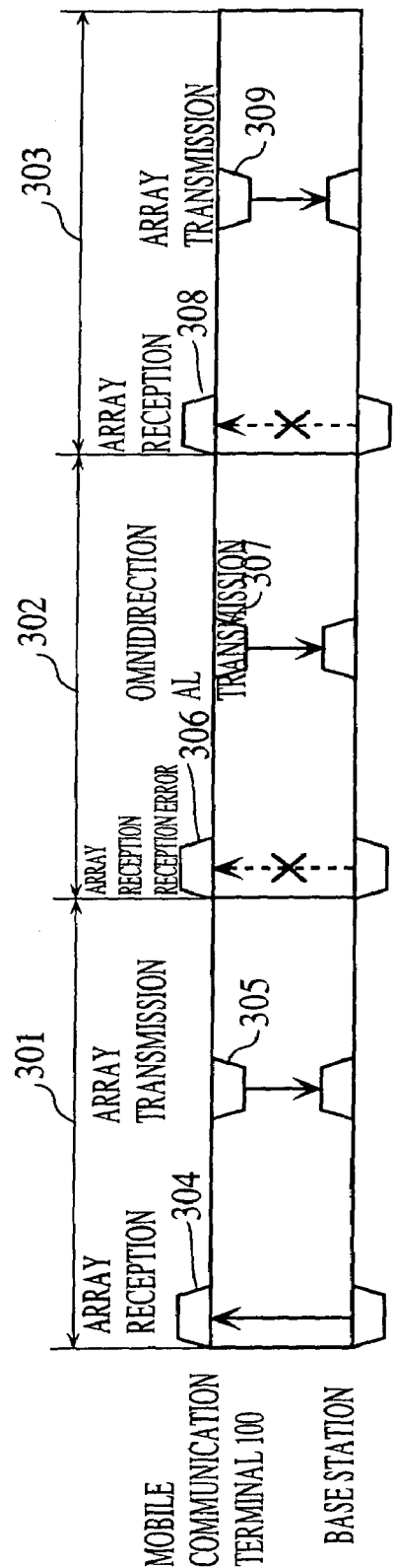
FIG. 3 shows an example of how the mobile communication terminal operates.

In FIG. 3, for example, the mobile communication terminal 100 performs reception and transmission with the base station for each of the frames 301 to 303. In a reception slot 304 of the frame 301, the mobile communication terminal 100 calculates weight vectors for forming a directivity pattern towards a base station and receives signals from the base station by the adaptive array. If no error is detected in the reception slot 304, the mobile communication terminal 100 performs array transmission using the weight vectors calculated in the reception slot 304, in a transmission slot 305 corresponding to the reception slot 304. In a reception slot 306 of the frame 302, the mobile communication terminal 100 calculates the weight vectors for forming a directivity pattern towards the base station, and receives signals using the adaptive array. Suppose a reception error is detected in this reception slot 306. Then transmission signals are transmitted in a non-directional pattern in a transmission slot 307 corresponding to a reception slot 306. In a reception slot 308 of the frame 303, the mobile communication terminal calculates weight vectors for forming a directivity pattern towards the base station and receives signals using the adaptive array. No reception error is detected during the reception period, so in a transmission slot 309 corresponding to the reception slot 308 the received signals are transmitted using the weight vectors calculated in the reception slot 308.

In this way, the mobile communication terminal 100 switches between omnidirectional transmission and array transmission, depending on whether a reception error is detected or not.

Figure 4:
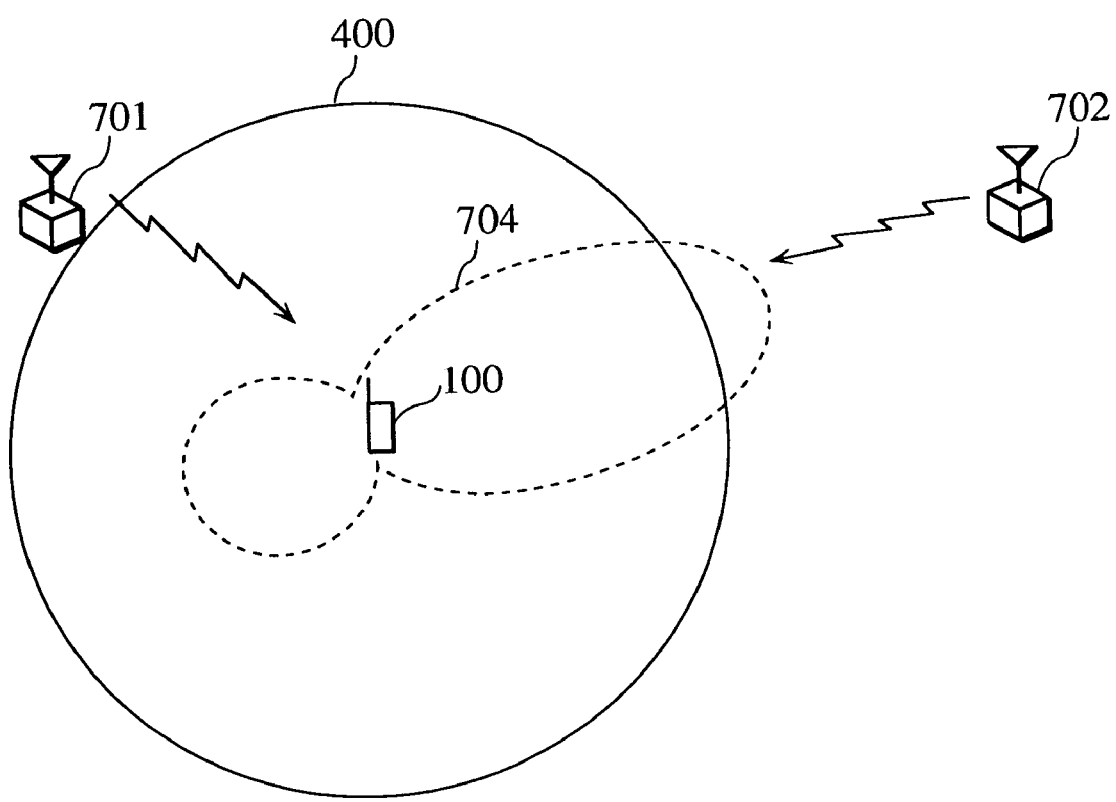
FIG. 4 shows an effect of omnidirectional transmission performed when the mobile communication terminal detects a reception error.

FIG. 4 shows the effect of omnidirectional transmission which is performed when a reception error is detected.

As shown in FIG. 4, if the mobile communication terminal 100 fails to properly receive signals by the adaptive array from a base station 701 with which the mobile communication terminal 100 is in communication, and forms a wrong directivity pattern 704, the reception signals are not demodulated properly, and as a result, a reception error is detected. In this case, the mobile communication terminal 100 forms a non-directional pattern 400 in a corresponding transmission slot and transmits signals in omnidirection. Using the omnidirectional pattern 400 increases the probability of the transmission signals reaching the base station 701, when compared with the transmission performed using the same directivity pattern 704 as in the reception. Also, the directivity pattern 400 does not have a high directivity towards another base station 702, so that communications by the other base station 702 will not be interfered.

If omnidirectional transmission is performed on the occurrence of an error in one frame, and in the following frame the transmission signals from a base station are demodulated properly without any errors, omnidirectional transmission is switched back to adaptive array transmission so that the mobile communication terminal 100 continues the communication with the base station 701.

Suppose the directivity pattern 704 is formed and not omnidirectional transmission but array transmission is performed when a reception error is detected, as in the case of a conventional mobile communication terminal. The directivity pattern 704 has null directivity towards the base station 701, while having higher directivity towards the other base station 702. This being so, transmission signals cannot reach the intended base station 701. Moreover, the transmission signals instead reach the base station 702 and interfere with communications by the base station 702.

The mobile communication terminal 100 of the invention, however, does not have such problems.

Second Embodiment

The following describes a mobile communication terminal in the second embodiment of the invention.

Figure 5:
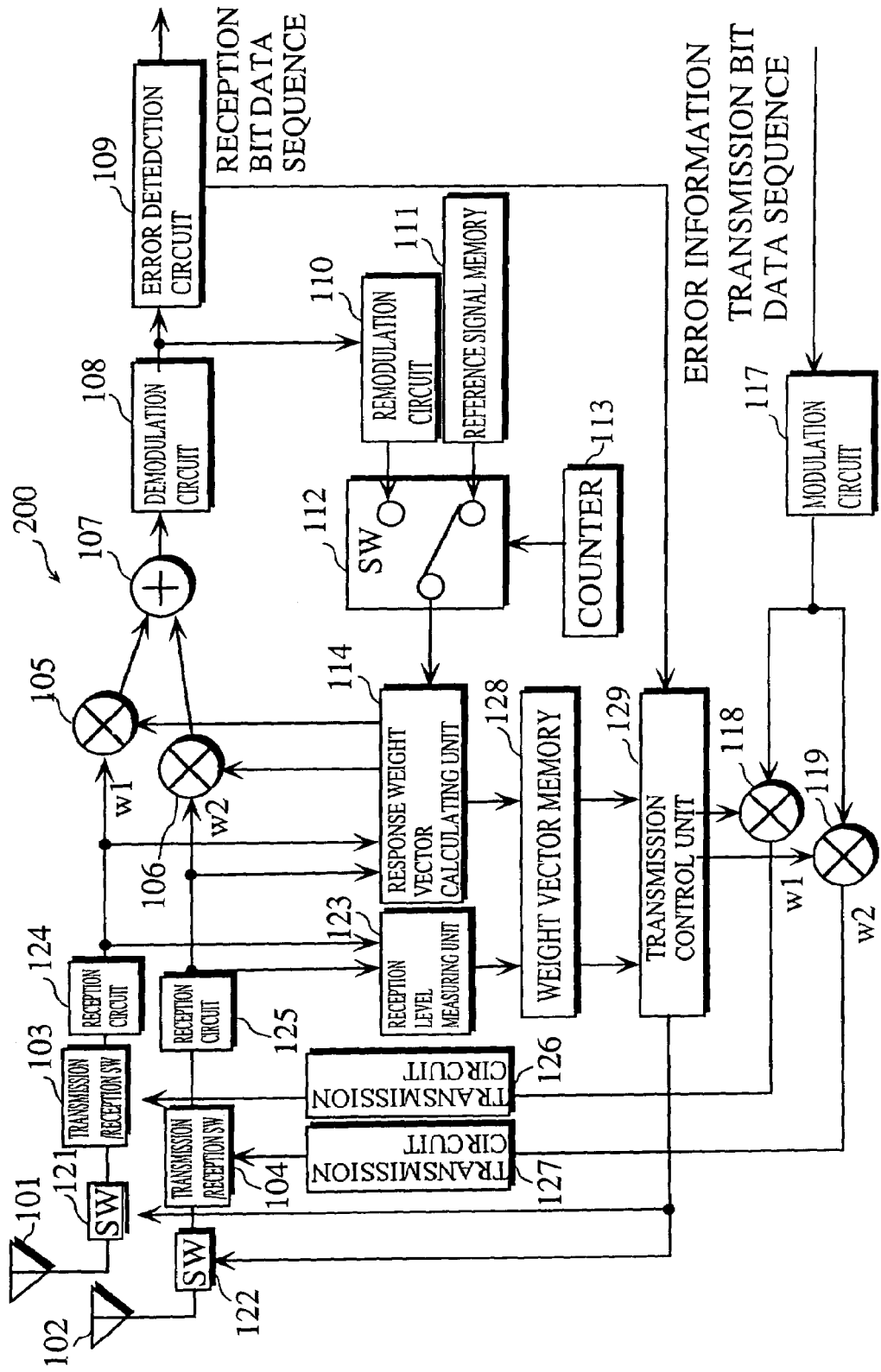
FIG. 5 is a block diagram showing a construction of a mobile communication terminal in the second embodiment.

FIG. 5 is a block diagram showing the construction of the mobile communication terminal in the present embodiment.

As shown in FIG. 5, a mobile communication terminal 200 differs from the mobile communication terminal 100 of FIG. 1 in that it includes a reception level measuring unit 123, switches 121 and 122 in place of the switch 120, and a transmission control unit 129 in place of the transmission control unit 116. Construction elements which are the same as those shown in FIG. 1 are given the same reference numerals, and their explanation is omitted here. The following description focuses on the differences with the first embodiment.

The reception level measuring unit 123 measures reception levels R1 and R2 of signals received from the reception circuits 124 and 125, and outputs them to the weight vector memory 128. The reception levels R1 and R2 indicate reception qualities of the antennas 101 and 102, respectively.

The weight vector memory 128 stores the weight vectors W1 and W2 in the same way as the weight vector memory 115, and also stores the reception levels R1 and R2 output from the reception level measuring unit 123. Here, the weight vector memory 128 may store the reception levels R1 and R2 for a few preceding frames, for a frame where a reception error is detected, or for several preceding frames except frames where an error is detected.

The switches 121 and 122 convey weighted signals outputted from the multipliers 118 and 119 to the antennas 101 and 102 in array transmission. In omnidirectional transmission, one of the switches 121 and 122 is turned off under control of the transmission control unit 129. As a result, the transmission signals from the modulation circuit 117 pass through the selected switch to one of the antennas 101 and 102.

The transmission control unit 129 operates in the same way as the transmission control unit 116 in the first embodiment in the case of array transmission, when a reception error is not notified from the error detection circuit 109. When a reception error is detected by the error detection circuit 109, however, the transmission control unit 129 exercises control so that transmission signals are omnidirectionally sent from an antenna that has a higher reception level, as explained below.

Which is to say, on being informed of the detection of a reception error by the error detection circuit 109, the transmission control unit 129 reads the reception levels R1 and R2 from the weight vector memory 128 and compares the two levels. The transmission control unit 129 turns off one of the switches 121 and 122 that has a lower reception level. For instance, when the reception level R1 of the antenna 101 is lower than the reception level R2, the switch 121 is turned off, whereas when the reception level R2 of the antenna 102 is lower than the reception level R1, the switch 122 is turned off. If reception levels R1 and R2 for several frames are stored in the weight vector memory 128, the average reception levels R1 and R2 for all those frames may be calculated and compared with each other.

Also, the transmission control unit 129 does not provide the weight vectors W1 and W2 to the multipliers 118 and 119, to prohibit the multipliers 118 and 119 apply weights.

Therefore, when a reception error has occurred, a switch corresponding to an antenna having a lower reception level is turned off, and only a switch corresponding to an antenna having a higher reception level is brought into conduction. Via the conducting switch, transmission signals outputted from the modulation circuit 117 are sent from the antenna with the higher reception level. Since the transmission signals are outputted via a single antenna in this case, a directivity pattern formed here is a circular and non-directional directivity pattern.

Figure 6:
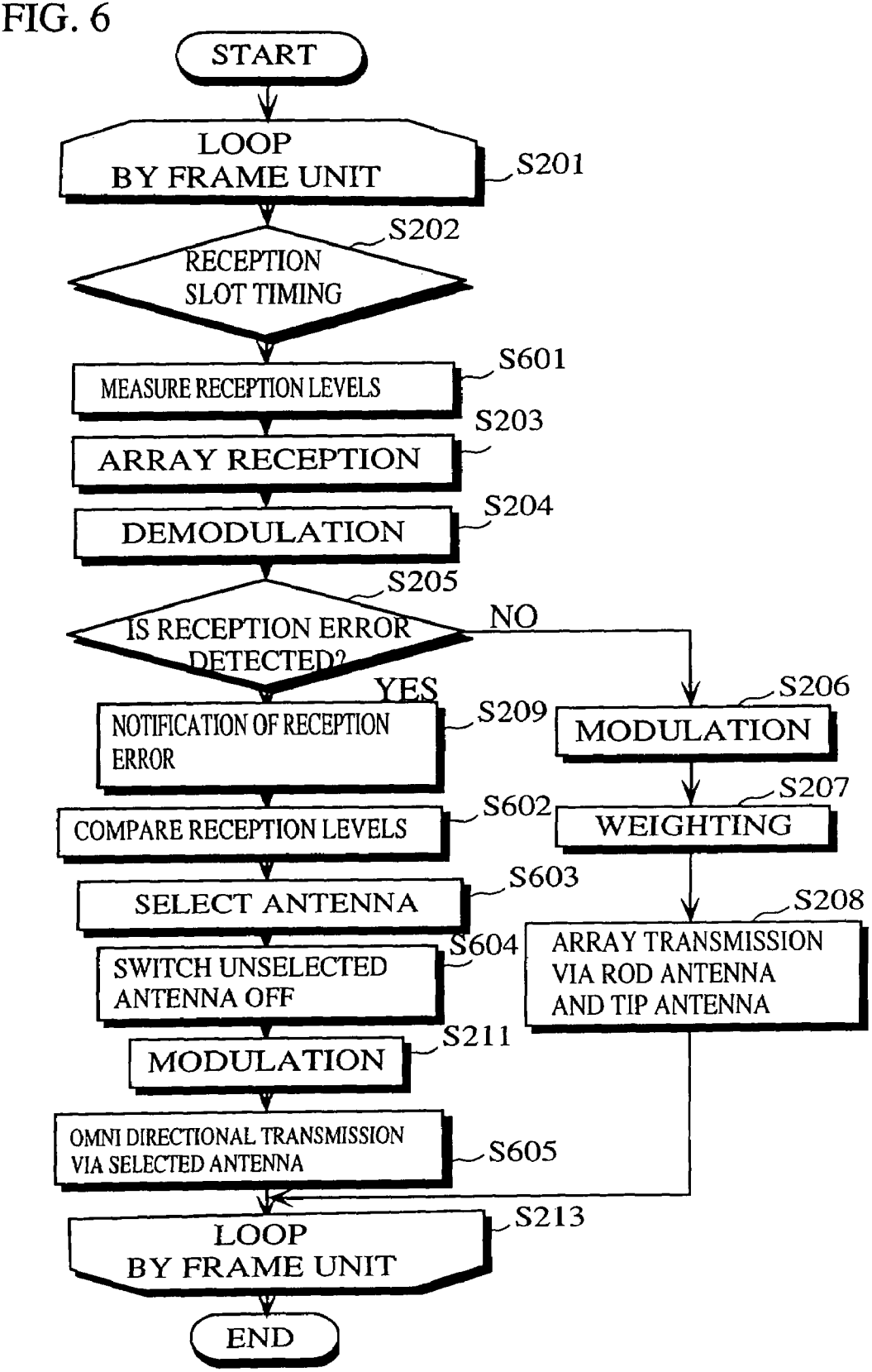
FIG. 6 is a flowchart showing the operational procedure of the mobile communication terminal shown in FIG. 5.

FIG. 6 is a flowchart showing the operational procedure of the mobile communication terminal 200.

In FIG. 6, steps which are the same as those in FIG. 2 are given the same numbers.

In a reception slot, the reception level measuring unit 123 measures the reception levels R1 and R2 of the antennas 101 and 102 respectively, and stores them in the weight vector memory 128 (step S601). After this, as in the first embodiment, the response weight vector calculating unit 114 calculates weight vectors W1 and W2. The multipliers 105 and 106 and the adder 107 use these weight vectors W1 and W2 to perform array reception (step S204). The combined reception signal is demodulated by the demodulation circuit 108 (step S204).

When the error detection circuit 109 detects that an error has occurred in the demodulated reception bit data sequence (step S205), the error detection circuit 109 informs the transmission control unit 129 of the reception error (step S209).

The transmission control unit 129 compares the reception level R1 with R2, which are stored in the weight vector memory 128 (step S602), and selects one of the antennas 101 and 102 that has a higher reception level as an omnidirectional transmission antenna (step S603). The transmission control unit 129 then turns off one of the switches 121 and 122 that is connected to the unselected antenna (step S604).

The modulation circuit 117 converts transmission bit sequence into transmission signals and output them in a transmission slot. The transmission signals are transmitted omnidirectionally from the selected antenna, without being weighted by the multipliers 118 and 119 (step S605).

With the stated construction, the mobile communication terminal 200 in the present embodiment uses an antenna of a higher reception level, that is, a higher reception quality, for performing omnidirectional transmission in a frame in which an error has occurred. This increases not only the antenna gain in transmission, but also the probability of transmission signals reaching the intended base station even when a reception error occurs.

Modifications

Though the mobile communication terminal of the present invention has been described based on the above embodiments, the invention should not be limited to such. For example, the following modifications are possible.

(1) In the above embodiments, the antenna 101 is a rod antenna and the antenna 102 is a tip antenna. However, other kinds of antennas can be used for the antennas 101 and 102.

(2) In the second embodiment, a reception level for each antenna is measured to select an omnidirectional transmission antenna. However, a C/N ratio (carrier-to-noise ratio) can be measured instead.

(1) The mobile communication terminal in the first embodiment is constructed so as to use a rod antenna for omnidirectional transmission when a reception error occurs. However, a tip antenna can be used instead of the rod antenna.

Also, a mobile communication terminal having a plurality of antennas with different antenna gains may be constructed so as to transmit signals in omnidirection using an antenna with the largest antenna gain when an error is detected. By doing so, the transmission signals can travel longer than in the case where the other antennas are used. This further raises the probability of the transmission signals reaching the intended base station.

(2) In the first and second embodiments, the mobile communication terminals are constructed so as to form a non-directional pattern when an error is detected. However, the pattern formed in such a case is not limited to a non-directional pattern, so long as a directivity pattern to be formed is different from an original directivity pattern formed during reception. For instance, when a reception error is detected, a directivity pattern that includes at least a part in which a radiant intensity is enhanced in a direction other than a direction of the original directivity pattern may be formed. Alternatively, a directivity pattern in which the main lobe of the original directivity pattern is widened may be formed. Weight vectors used for forming these directivity patterns can be calculated from the weight vectors calculated in reception, according to a known technique.

(3) The present invention also applies to a communication method realized by the operational procedures of the mobile communication terminals described above.

(4) This method may be realized by a computer program which is executed on a general-purpose computer or a device having program executing capability. The computer program recorded on a recording medium may be distributed. Also, the computer program may be distributed through a network. Such a recording medium includes IC cards, optical discs, flexible discs, ROMs and the like.

(5) The above embodiments and the modifications (1) to (6) may be used in combination.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A mobile communication terminal for performing reception and transmission using an adaptive array method, the mobile communication terminal being provided with (a) a plurality of antennas, (b) reception means for forming a directivity pattern for receiving a desired reception signal from a base station and receiving the reception signal from the base station using the formed directivity pattern, and (c) transmission means for transmitting at least one of a transmission signal using the directivity pattern formed in reception and an omnidirectional transmission signal, the mobile communication terminal comprising:

detection means for detecting a reception error in the reception signal; and transmission control means for controlling the transmission means, wherein when the detection means detects the reception error in the reception signal the transmitted transmission signal is the omnidirectional transmission signal and when the detection means does not detect the reception error, the transmission signal is transmitted in the directivity pattern formed in reception.

2. The mobile communication terminal of claim 1, wherein when the detection means detects the reception error, the transmission control means controls the transmission means so that the omnidirectional transmission signal is formed using one of the plurality of antennas, and the transmission signal is transmitted in an omnidirectional pattern.

3. The mobile communication terminal of claim 2, wherein when the detection means detects the reception error, the transmission control means controls the transmission means so that the omnidirectional transmission signal is formed using one of the plurality of antennas that has the largest antenna gain, and the transmission signal is transmitted in the omnidirectional pattern.

4. The mobile communication terminal of claim 2 further comprising:

selection means for measuring a quality of the reception signal for each of the plurality of antennas and selecting an antenna with the highest reception quality, wherein when the detection means detects the reception error, the transmission control means controls the transmission means so that the omnidirectional pattern is formed using the antenna selected by the selection means, and the transmission signal is transmitted in the omnidirectional pattern.

5. A mobile communication method for performing reception and transmission using an adaptive array method, the mobile communication terminal being provided with (a) a plurality of antennas, (b) reception means for forming a directivity pattern for receiving a desired reception signal from a base station and receiving the reception signal from the base station using the formed directivity pattern, and (c) transmission means for transmitting at least one of a transmission signal using the directivity pattern formed in reception and an omnidirectional transmission signal, the mobile communication method comprising:

detection step for detecting a reception error in the reception signal; and transmission control step for controlling the transmission means, wherein when the detection step detects the reception error in the reception signal the transmitted transmission signal is the omnidirectional transmission signal and when the detection step does not detect the reception error, the transmission signal is transmitted in the directivity pattern formed in reception.

6. The communication method of claim 5,
wherein when the detection step detects the reception error, the transmission control step controls the transmission means so that the omnidirectional transmission signal is formed using one of the plurality of antennas, and the transmission signal is transmitted in an omnidirectional pattern.

7. The communication method of claim 6,
wherein when the detection step detects the reception error, the transmission control step controls the transmission means so that the omnidirectional transmission signal is formed using one of the plurality of antennas that has the largest antenna gain, and the transmission signal is transmitted in the omnidirectional pattern.

8. The communication method of claim 6 further comprising:
selection step for measuring a quality of the reception signal for each of the plurality of antennas and selecting an antenna with the highest reception quality,
wherein when the detection step detects the reception error, the transmission control step controls the transmission means so that the omnidirectional pattern is formed using the antenna selected by the selection means, and the transmission signal is transmitted in the omnidirectional pattern.

9. A program to be executed by a computer in a mobile communication terminal for performing reception and transmission using an adaptive array method, the program being stored on a computer-readable recording medium, the mobile communication terminal being provided with (a) a plurality of antennas, (b) reception means for forming a directivity pattern for receiving a desired reception signal from a base station and receiving the reception signal from the base station using the formed directivity pattern, and (c) transmission means for transmitting at least one of a transmission signal using the directivity pattern formed in reception and an omnidirectional transmission signal, the program comprising:
detection step for detecting a reception error in the reception signal; and
transmission control step for controlling the transmission means, wherein when the detection step detects the reception error in the reception signal the transmitted transmission signal is the omnidirectional transmission signal and when the detection step does not detect the reception error, the transmission signal is transmitted in the directivity pattern formed in reception.

10. The program of claim 9,
wherein when the detection step detects the reception error, the transmission control step controls the transmission means so that the omnidirectional transmission signal is formed using one of the plurality of antennas, and the transmission signal is transmitted in an omnidirectional pattern.

11. The program of claim 10,
wherein when the detection step detects the reception error, the transmission control step controls the transmission means so that the omnidirectional transmission signal is formed using one of the plurality of antennas that has the largest antenna gain, and the transmission signal is transmitted in the omnidirectional pattern.

12. The program of claim 10 further comprising:
selection step for measuring a quality of the reception signal for each of the plurality of antennas and selecting an antenna with the highest reception quality,
wherein when the detection step detects the reception error, the transmission control step controls the transmission means so that the omnidirectional pattern is formed using the antenna selected by the selection means, and the transmission signal is transmitted in the omnidirectional pattern.

13. A mobile communication terminal for performing reception and transmission using an adaptive array method, the mobile communication terminal being provided with (a) a plurality of antennas, (b) a reception circuit which multiplies a signal received using each of the plurality of antennas by a weight vector, and (c) a transmission circuit which transmits the multiplied signal using each of the plurality of antennas, the reception circuit forming a directivity pattern for receiving a desired reception signal from a base station and receiving the reception signal from the base station using the formed directivity pattern, and the transmission circuit transmitting at least one of a transmission signal using the directivity pattern formed in reception and an omnidirectional transmission signal, the mobile communication terminal comprising:
detection means for detecting a reception error in the reception signal; and
transmission control means for controlling the transmission circuit, wherein when the detection means detects the reception error in the reception signal the transmitted transmission signal is the omnidirectional transmission signal and when the detection means does not detect the reception error the transmission signal is transmitted in the directivity pattern formed in reception.

14. The mobile communication terminal of claim 13,
wherein when the detection means detects the reception error, the transmission control means controls the transmission means so that the omnidirectional transmission signal is formed using one of the plurality of antennas, and the transmission signal is transmitted in an omnidirectional pattern.

15. The mobile communication terminal of claim 14,
wherein when the detection means detects the reception error the transmission control means controls the transmission means so that the omnidirectional transmission signal is formed using one of the plurality of antennas that has the largest antenna gain, and the transmission signal is transmitted in the omnidirectional pattern.

16. The mobile communication terminal of claim 14 further comprising:
selection means for measuring a quality of the reception signal for each of the plurality of antennas and selecting an antenna with the highest reception quality,
wherein when the detection means detects the reception error, the transmission control means controls the transmission means so that the omnidirectional pattern is formed using the antenna selected by the selection means, and the transmission signal is transmitted in the omnidirectional pattern.

17. A communication method used for a mobile communication terminal for performing reception and transmission using an adaptive array method, the mobile communication terminal being provided with (a) a plurality of antennas, (b) a reception circuit which multiplies a signal received using each of the plurality of antennas by a weight vector, and (c) a transmission circuit which transmits the multiplied signal using each of the plurality of antennas, the reception circuit forming a directivity pattern for receiving a desired reception signal from a base station and receiving the reception signal from the base station using the formed directivity pattern, and the transmission circuit transmitting at least one of a transmission signal using the directivity pattern formed in reception and an omnidirectional transmission signal, the mobile communication method comprising:

detection step for detecting a reception error in the reception signal; and transmission control step for controlling the transmission means, wherein when the detection step detects the reception error in the reception signal the transmitted transmission signal is the omnidirectional transmission signal and when the detection step does not detect the reception error, the transmission signal is transmitted in the directivity pattern formed in reception.

18. The communication method of claim 17, wherein when the detection step detects the reception error, the transmission control step controls the transmission means so that the omnidirectional transmission signal is formed using one of the plurality of antennas, and the transmission signal is transmitted in an omnidirectional pattern.

19. The communication method of claim 18, wherein when the detection step detects the reception error, the transmission control step controls the transmission means so that the omnidirectional transmission signal is formed using one of the plurality of antennas that has the largest antenna gain, and the transmission signal is transmitted in the omnidirectional pattern.

20. The communication method of claim 18 further comprising:

selection step for measuring a quality of the reception signal for each of the plurality of antennas and selecting an antenna with the highest reception quality wherein when the detection step detects the reception error, the transmission control step controls the transmission means so that the omnidirectional pattern is formed using the antenna selected by the selection means, and the transmission signal is transmitted in the omnidirectional pattern.

21. A program to be executed by a computer in a mobile communication terminal for performing reception and transmission using an adaptive array method, the program being stored on a computer-readable recording medium, the mobile communication terminal being provided with (a) a plurality of antennas, (b) a reception circuit which multiplies a signal received using each of the plurality of antennas by a weight vector, and (c) a transmission circuit which transmits the multiplied signal using each of the plurality of antennas, the reception circuit forming a directivity pattern for receiving a desired reception signal from a base station and receiving the reception signal from the base station using the formed directivity pattern, and the transmission circuit transmitting at least one of a transmission signal using the directivity pattern formed in reception and an omnidirectional transmission signal, the program comprising:

detection step for detecting a reception error in the reception signal; and transmission control step for controlling the transmission means, wherein when the detection step detects the reception error in the reception signal the transmitted transmission signal is the omnidirectional transmission signal and when the detection step does not detect the reception error, the transmission signal is transmitted in the directivity pattern formed in reception.

22. The program of claim 21, wherein when the detection step detects the reception error, the transmission control step controls the transmission means so that the omnidirectional transmission signal is formed using one of the plurality of antennas, and the transmission signal is transmitted in an omnidirectional pattern.

23. The program of claim 22, wherein when the detection step detects the reception error, the transmission control step controls the transmission means so that the omnidirectional transmission signal is formed using one of the plurality of antennas that has the largest antenna gain, and the transmission signal is transmitted in the omnidirectional pattern.

24. The program of claim 22 further comprising:

selection step for measuring a quality of the reception signal for each of the plurality of antennas and selecting an antenna with the highest reception quality, wherein when the detection step detects the reception error, the transmission control step controls the transmission means so that the omnidirectional pattern is formed using the antenna selected by the selection means, and the transmission signal is transmitted in the omni directional pattern.

25. A method for ensuring a signal is transmitted to a proper destination, comprising the steps of:

receiving, from a base station, a first signal at a mobile communication device, the first signal comprising a first directivity pattern;

determining, by the mobile communication device, wherein the first signal includes a reception error; and transmitting, by the mobile communication device, one of a second signal to the base station when the first signal does not include the reception error, the second signal comprising a second directivity pattern corresponding to the first directivity pattern, and a third signal comprising an omnidirectional pattern when the first signal includes the reception error.

26. The method of claim 25, wherein the first signal includes the reception error, the method further comprising the steps of:

receiving, from the base station, a fourth signal at the mobile communication device, the fourth signal comprising a third directivity pattern;

determining, by the mobile communication device, that the fourth signal does not include the reception error; and transmitting, by the mobile communication device, a fifth signal to the base station, the fifth signal comprising a fourth directivity pattern corresponding to the third directivity pattern.

27. The method of claim 26, further comprising the step of:

transmitting, by the mobile communication device, a sixth signal comprising the omnidirectional pattern prior to the step of the mobile communication device determining the fourth signal does not include the reception error.

28. The method of claim 27, further comprising the step of:

continuing, by the mobile communication device, to transmit signals comprising the omnidirectional pattern after the step of the mobile communication device transmitting the sixth signal until the step of the mobile communication device determining the fourth signal does not include the reception error.

* * * * *